United States Patent [19]

Herbst et al.

[11] Patent Number: 4,749,470

[45] Date of Patent: Jun. 7, 1988

[54] RESIDUUM FLUID CATALYTIC CRACKING PROCESS AND APPARATUS USING MICROWAVE ENERGY

[75] Inventors: Joseph A. Herbst, Turnersville; Hartley Owen, Belle Mead, both of N.J.; Paul H. Schipper, Wilmington, Del.

[73] Assignee: Mobil Oil Corporation, New York, N.Y.

[21] Appl. No.: 903,314

[22] Filed: Sep. 3, 1986

[51] Int. Cl.$^4$ ............................................. C10G 55/02
[52] U.S. Cl. ...................... 208/85; 208/113; 208/155; 204/157.15; 204/157.6; 204/158.14; 219/10.57
[58] Field of Search ............... 208/113, 85; 204/157.15, 157.61, 158.14; 219/10.57; 431/11, 208

[56] References Cited

U.S. PATENT DOCUMENTS

| | | | |
|---|---|---|---|
| 2,352,435 | 6/1944 | Hoeffelman | 204/157.6 |
| 2,516,848 | 8/1950 | Brasch | 204/157.6 |
| 2,553,944 | 5/1951 | Schlesman | 204/171 |
| 2,904,483 | 9/1959 | Long et al. | 204/158.14 |
| 2,905,607 | 9/1959 | Long et al. | 204/158.14 |
| 2,953,509 | 9/1960 | Ruskin | 204/157.15 |
| 3,048,529 | 8/1962 | Mohlman | 204/157.15 |
| 3,094,472 | 6/1963 | Greenwald et al. | 204/157.15 |
| 3,125,498 | 3/1964 | Bartok et al. | 204/157.15 |
| 3,228,849 | 1/1966 | Fellows | 204/157.6 |
| 3,228,850 | 1/1966 | Fellows | 204/158.14 |
| 3,268,432 | 8/1966 | Nance | 204/162 |
| 3,503,865 | 3/1970 | Stone | 208/10 |
| 3,886,060 | 5/1975 | Owen | 208/120 |
| 3,894,931 | 7/1975 | Nace et al. | 208/73 |
| 3,984,935 | 7/1975 | Owen | 208/78 |
| 4,144,189 | 3/1979 | Kirkbride | 252/414 |
| 4,153,533 | 5/1979 | Kirkbride | 204/157.6 |
| 4,230,448 | 10/1980 | Ward et al. | 431/208 |
| 4,279,722 | 7/1981 | Kirkbride | 204/162 R |
| 4,376,034 | 3/1983 | Wall | 208/11 R |
| 4,398,076 | 8/1983 | Hanson | 219/10.55 A |
| 4,419,214 | 12/1983 | Balint et al. | 208/8 R |
| 4,427,539 | 1/1984 | Busch et al. | 208/113 |
| 4,443,325 | 4/1984 | Chen et al. | 208/55 |
| 4,541,923 | 9/1985 | Lomas et al. | 208/113 |
| 4,545,879 | 10/1985 | Wan et al. | 204/158 R |
| 4,659,452 | 4/1987 | Howell | 208/89 |
| 4,676,887 | 6/1987 | Fischer et al. | 208/61 |

*Primary Examiner*—Helen M. S. Sneed
*Assistant Examiner*—Anthony McFarlane
*Attorney, Agent, or Firm*—Alexander J. McKillop; Michael G. Gilman; Marina V. Schneller

[57] ABSTRACT

A fluid catalytic cracking (FCC) process and apparatus which exposes a residuum to microwave energy to activate the residuum prior to feeding to a fluid catalytic cracking riser. The process and apparatus also cracks a portion of a light hydrocarbon stream to produce reactive free radical and olefinic compounds by contacting the light hydrocarbon stream with a fluid catalytic cracking stream in the riser. The catalyst and activated light hydrocarbon stream then combines with the microwave-activated residuum in the riser. The present invention may be employed in a multiple riser system or in a single riser system. The present invention minimizes coke production by quickly and uniformly heating residuum in the microwave heater prior to passing into the riser. The present invention further minimizes coke production by combining the residuum with the catalyst and light hydrocarbons in the riser for, preferably, less than about 1 second, prior to separating the hydrocarbons from the catalyst in the multiple riser system, or prior to diluting the residuum with vacuum gas oil, additional catalyst and recycled heavy cycle oil in the single riser system.

11 Claims, 3 Drawing Sheets

RESIDUUM FLUID CATALYTIC CRACKING PROCESS AND APPARATUS USING MICROWAVE ENERGY

BACKGROUND OF THE INVENTION

1. Field of the Invention

The invention relates to a process and apparatus for fluid catalytic cracking a hydrocarbon feedstock which has been exposed to microwave energy. More particularly, the present invention relates to a process for fluid catalytic cracking a residuum which has been exposed to microwave energy prior to contact with fluid catalytic cracking catalysts.

2. Discussion of the Prior Art

In known and conventional catalytic cracking processes, a hydrocarbon feedstock, such as gas oil, is cracked in an elongated reactor riser, at elevated temperatures to provide a mixture of lighter hydrocarbon products. Suitable cracking catalyts include large pore crystalline zeolites, such as zeolite X or Y, and intermediate pore crystalline zeolites, such as ZSM-5. The products of the reaction, together with catalysts, are discharged into a separator located within an elongated stripping vessel, with the spent catalyst flowing downwardly therein. Prior to transfer to a catalyst regenerator unit, entrained hydrocarbon product is removed from the spent catalyst by means of a stripping gas, such as steam or nitrogen. Following regeneration, the catalyst is reintroduced into the riser to participate in another cycle of operation. Fluid catalytic processes are described in U.S. Pat. Nos. 3,617,497 to Bryson et al and 4,219,407 to Haddad et al.

Microwaves have been employed to heat hydrocarbon streams. U.S. Pat. No. 4,230,448 to Ward et al discloses an oil burner having a microwave energy source connected to a fuel supply line to heat the fuel.

U.S. Pat. No. 4,279,722 to Kirkbride discloses subjecting hydrocarbon reactants in contact with catalytic material, such as fluid catalytic cracking catalysts, with microwaves.

It would be desirable to provide a fluid catalytic cracking process which benefits from microwave energy but does not apply the microwave energy to hydrocarbons when the hydrocarbons contact catalysts.

SUMMARY OF THE INVENTION

It is one object of the present invention to provide an improved fluid catalytic cracking process and apparatus which includes exposing a residuum feed stream to microwave energy prior to contact with a mixture of fluid catalytic cracking catalysts and $C_1$–$C_4$ hydrocarbons.

It is another object of the present invention to provide a dual riser fluid catalytic cracking process and apparatus which feeds light hydrocarbons, fluid catalytic cracking catalysts and microwave preheated residuum to a first riser, and vacuum gas oil and fluid catalytic cracking catalysts to a second riser. It is another object of the present invention to provide a fluid catalytic cracking process and apparatus which feeds $C_1$–$C_4$ hydrocarbons, regenerated catalyst, microwave preheated residuum, and vacuum gas oil to a fluid catalytic cracking riser.

It is another object of the present invention to provide a fluid catalytic cracking process and apparatus which recycles heavy gas oil to a fluid catalytic cracking riser.

The present invention mixes light, preferably olefinic, hot reactive hydrocarbons with a microwave activated residuum in a riser at a short contact time followed by either separation of hydrocarbons from the catalyst or dilution of the reactive residuum and light gas by injection of vacuum gas oil.

In its process aspects, the present invention provides a fluid catalytic cracking process which exposes a residuum to microwave energy sufficient to heat the residuum, optionally preheated by means other than microwaves, at least 25° F., preferably at least 200° F., and then injects the heated residuum stream into a fluid catalytic cracking riser. Preferably, the residuum residence time in the riser is less than about 1 second, most preferably between 0.5 and 1 second. In the riser, the heated residuum combines with fluid catalytic cracking catalysts and a light hydrocarbon stream, comprising $C_1$–$C_4$ hydrocarbons, a portion of which are preferably olefins. A portion of the light hydrocarbons convert to olefins, by contact with the catalysts, prior to combining with residuum.

The catalyst, light hydrocarbons and residuum pass upwardly through the riser into a reactor vessel where the catalyst is separated from cracked hydrocarbons. The cracked hydrocarbons pass out of the reactor vessel to downstream fractionation while the catalyst is stripped and passed to regeneration. In its apparatus aspects, the present invention provides a means for exposing a residuum stream, optionally preheated by means other than microwaves, to microwave energy sufficient to heat the residuum at least 25° F., preferably at least 200° F. Also provided is a means for passing the heated residuum into a first fluid catalytic cracking riser to combine with regenerated catalyst and a light hydrocarbon stream comprising $C_1$–$C_4$ hydrocarbons, a portion of which are preferably olefins. The first riser is preferably sized to provide a residuum residence time less than 1 second, and most preferably between 0.5 and 1 second. A mixture of the first catalyst stream, light gas stream, and residuum passes upwardly through the first riser into a reactor vessel (settling chamber) where the catalyst is separated from the hydrocarbons. The separated hydrocarbons pass out of the reactor vessel to a distillation unit. Means for stripping the separated catalyst and means for passing the stripped catalyst to a regenerator are provided.

The invention may further include fluid catalytic cracking of a vacuum gas oil stream. The vacuum gas oil may be cracked either in a second riser attached to a second reactor vessel or in the first riser in a zone downstream of where the residuum is injected, or in a second riser attached to the first reactor vessel. The hydrocarbon products from fluid catalytic cracking of the vacuum gas oil preferably pass to the distillation unit to recover a heavy oil stream comprising 650° F.+ (343° C.+) hydrocarbons. The heavy oil stream combines with the vacuum gas oil stream and recycles either to the second riser of one of the dual riser systems or to the single riser of the single riser system. The residuum is exposed to microwave energy in the range from 1.0 to 1000 gigacycles per second ($1.0 \times 10^9$ to $10^{12}$ cycles per second, respectively). Typically, the microwave energy heats the residuum to between 600° and 820° F. (316°–438° C.) and the residuum is exposed to the microwave energy for, at most, 5 minutes. Preferably, the microwave energy heats the residuum to between 820° and 1100° F. (438°-593° C.) and the residuum is exposed to the microwave energy for, at most 1 minute, more preferably, at most, 30 seconds. Most preferably, the microwave energy heats the residuum to a temperature between 900° and 1100° F. (482°-593° C.) and the residuum is exposed to the microwave energy for, at most, 15 seconds.

The present invention has advantages because it reduces coking of residuum during fluid catalytic cracking. Coking is reduced because the microwave energy provides uniform and quick heating of the residuum. Furthermore, the microwave heating of the residuum forms reactive compounds, such as olefins, and free radicals within the residuum. The advantages are enhanced because light hydrocarbons contact hot regenerated catalyst, in a fluid catalytic cracking riser to form additional reactive compounds, prior to contact with the residuum. The reactive compounds, produced by microwaving the residuum may react with the reactive compounds in the light hydrocarbon stream. This promotes production of desirable gasoline and distillate during the upgrading of catalytically cracked residuum. Due to the presence of reactive compounds in both the light hydrocarbon stream and in the residuum stream, the residuum quickly cracks when it combines with the catalyst and light hydrocarbons, and thus has little time for overcracking and coking. Preferably, the residuum residence time within the riser is less than 1 second, and most preferably between 0.5 and 1 second, to provide sufficient time for cracking while minimizing coking.

BRIEF DESCRIPTION OF THE DRAWINGS

The above and other objects, advantages and features of the present invention will be still more fully understood when considered in conjunction with the following drawings, of which.

DETAILED DESCRIPTION OF THE INVENTION

Figure 1:
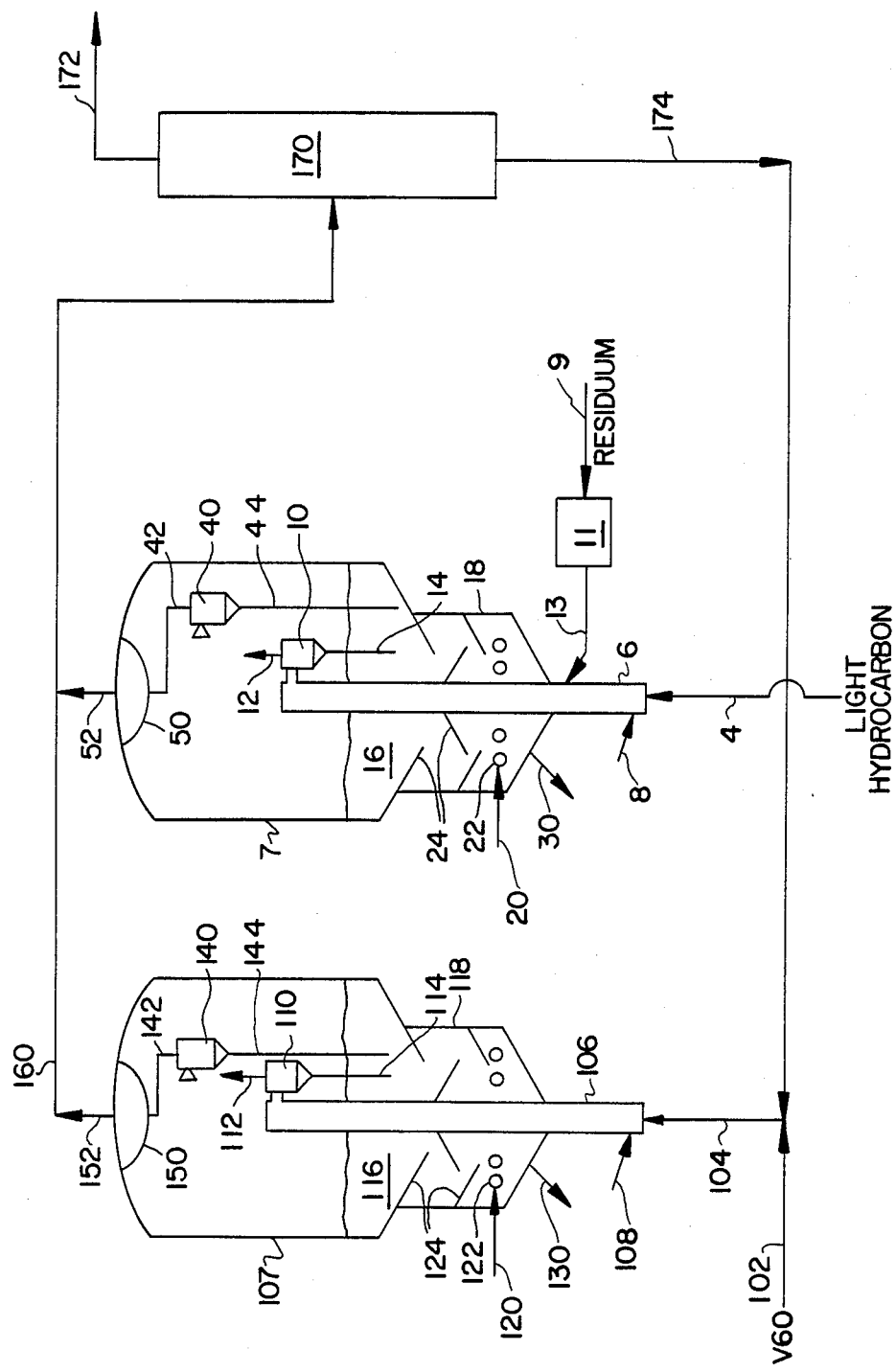
FIG. 1 illustrates a schematic diagram of a dual riser fluid catalytic cracking system as a first embodiment of the present invention.

As shown in FIG. 1, light hydrocarbons pass through a conduit 4 into a first fluid catalytic cracking riser reactor 6 to combine with a first regenerated catalyst stream, from a regenerator (not shown), which passes through conduit 8 which is attached to a fluid catalytic cracking regenerator (not shown). The light hydrocarbons comprise $C_1$-$C_4$ hydrocarbons, preferably a portion of which are olefins. The first regenerated catalyst stream in conduit 8 is typically at a temperature between 1200° and 1600° F. (649°-871° C.). Residuum passes through a conduit 9 into a microwave heater 11. Typically, the residuum comprises hydrocarbons having an initial boiling point of at least 400° F. (204° C.) and a final boiling point of at least 1000° F. (538° C.). The heater 11 heats the residuum by at least 25° F. (14° C.), preferably by at least 200° F. Typically, the microwave energy heats the residuum to beween 600° and 820° F. (316°-438° C.) and the residuum is exposed to the microwave energy for, at most, 5 minutes. Optionally, the residuum is preheated by means other than microwave energy. Preferably, the microwave energy heats the residuum to between 820° and 1100° F. (438°-593° C.) and the residuum is exposed to the microwave energy for, at most, 1 minute, more preferably, at most, 30 seconds. Most preferably, the microwave energy heats the residuum to a temperature between 900° and 1100° F. (482°-593° C.) and the residuum is exposed to the microwave energy for, at most, 15 seconds. The lower residence times are employed with the higher temperatures to minimize overcracking and coking. The heated residuum then passes from microwave heater 11, through a conduit 13, into the first riser 6 to combine with the first catalyst stream and light hydrocarbons to form a first mixture which passes upwardly through the riser 6, at fluid catalytic cracking conditions, to crack the hydrocarbons from the residuum and react with the light hydrocarbon streams.

Prior to contacting the first catalyst stream and light hydrocarbons with the residuum, a portion of the light hydrocarbons will crack by contact with the hot first catalyst stream from conduit 8 to form reactive compounds, such as olefins and free radicals. In the microwave heater 11, the residuum from conduit 9 is exposed to microwave energy from 1 to 1000 gigacycles per second ($1 \times 10^9$ to $10^{12}$ cycles per second). In addition to heating the residuum, the microwave energy causes a portion of the residuum to crack to a second set of reactive compounds comprising olefins and free radicals. Injecting olefins into a riser is discussed in U.S. Pat. No. 3,894,931 to Nace et al. Because both the light hydrocarbons and the heated residuum contain reactive compounds, combining the light hydrocarbons, catalyst and residuum at fluid catalytic cracking conditions in the riser achieves rapid fluid catalytic cracking of the residuum. Accordingly, the residuum residence time within riser 6 is preferably less than 1 second, most preferably between 0.5 and 1 second. The reactive compounds, produced by microwaving, in the residuum may react with the reactive compounds in the light hydrocarbons. This promotes production of adducts, such as gasoline and distillate boiling range hydrocarbons, while upgrading catalytically cracked residuum.

The first riser 6 terminates within a reactor vessel 7, so the mixture of catalyst and hydrocarbons passes upwardly through riser 6 and discharges from the riser into a riser cyclone 10 located within reactor vessel 7. Riser cyclone 10 separates the mixture into a catalyst stream which passes through a dipleg 14 into a catalyst bed 16 located therebelow, and a gaseous stream which exits through cyclone overhead conduit 12 and passes into an atmosphere of the vessel 7. The gaseous material passes from the atmosphere into a cyclone 40, which further separates catalyst from the gaseous material and passes the catalyst through dipleg 44 and the remaining gaseous material through overhead conduit 42 to a plenum chamber 50. The gaseous material passes from the plenum chamber 50 to a vessel overhead conduit 52 to a conduit 160.

The catalyst in bed 16 passes to a stripping vessel 18 provided in a lower portion of reactor vessel 7. Catalyst in bed 16 passes downwardly through vessel 18 and countercurrently contacts stripping gas provided by a conduit 20 attached to a stripping gas header 22. Vessel 18 may be provided with trays (baffles) 24 to enhance contact. The stripped catalyst exits vessel 18 through a catalyst withdrawal conduit 30 and passes to a regenerator vessel (not shown).

Vacuum gas oil passes through a conduit 102 and combines with a heavy cycle oil stream and/or main column bottoms from a conduit 174. The combined stream passes through conduit 104 into a second fluid catalytic cracking riser reactor 106, where it combines with a second regenerated catalyst stream from conduit 108 from a regenerator (not shown) to form a second mixture. The catalyst in conduit 108 typically has a temperature between 1200° and 1600° F. (649°–871° C.). The second mixture passes upwardly through riser 106 and discharges into a riser cyclone 110 located within a reactor vessel 107. Riser cyclone 110 separates the second mixture into a catalyst stream, which passes through a dipleg 114 to a catalyst bed 116 located therebelow, and a gaseous stream which passes through a cyclone overhead conduit 112 into an atmosphere of the vessel 107. The gaseous material then passes from the atmosphere of the vessel 107 into a cyclone 140, which separates catalyst from the gaseous material and passes the separated catalyst through a dipleg 144 to the bed 116. The remaining gaseous material passes through cyclone overhead conduit 142 to a plenum chamber 150. The remaining gaseous material then passes from chamber 150 to a reactor vessel overhead conduit 152, and then into conduit 160 where it combines with the gaseous material from conduit 52. If desired, the cyclones in vessels 7 or 107 may be arranged in a closed cyclone arrangement (not shown), as disclosed in U.S. Pat. No. 4,502,947 to Haddad et al, which is incorporated herein by reference.

The catalyst in bed 116 passes downwardly through a stripping vessel 118 located in a lower portion of reactor vessel 107. In vessel 118, the catalyst countercurrently contacts stripping gas provided by a stripping gas conduit 120 attached to a stripping gas header 122. Trays 124 may be provided to enhance stripping. The stripped catalyst then passes from the stripping vessel 118 through a catalyst withdrawal conduit 130 to a fluid catalytic cracking regenerator (not shown). The gaseous overhead from conduits 52, 152 pass into the conduit 160 which is attached to a distillation unit 170. Distillation unit 170 comprises one or more distillation towers or flash drums (not shown) to separate the hydrocarbons from conduit 160 into a product stream which passes through conduit 172, and a heavy cycle oil and/or main column bottoms stream which passes through conduit 174. The product stream comprises approximately 650° F.−(343° C.−) hydrocarbons, while the heavy cycle oil comprises approximately 650° F.+ (343° C.+) boiling point hydrocarbons. The heavy cycle oil and/or main column bottoms then passes through conduit 174, combines with vacuum gas oil from conduit 102, and then passes through conduit 104 into the second riser 106.

The advantages of the first embodiment of the present invention include providing a quick initial cracking of residuum. The quick cracking occurs because the residuum is activated by microwave energy and then combined, at fluid catalytic cracking conditions, with fluid catalytic cracking catalyst and light hydrocarbons which comprise reactive compounds. The present invention minimizes coke by employing rapid heating with microwave energy plus a short residence time of residuum in the riser. The process further enhances yields by separating the heaviest portion of the cracked residuum and recycling it to a second fluid catalytic cracking riser in combination with vacuum gas oil. The process also enhances yields by promoting reaction of activated residuum with the reactive light hydrocarbon compounds.

Figure 2:
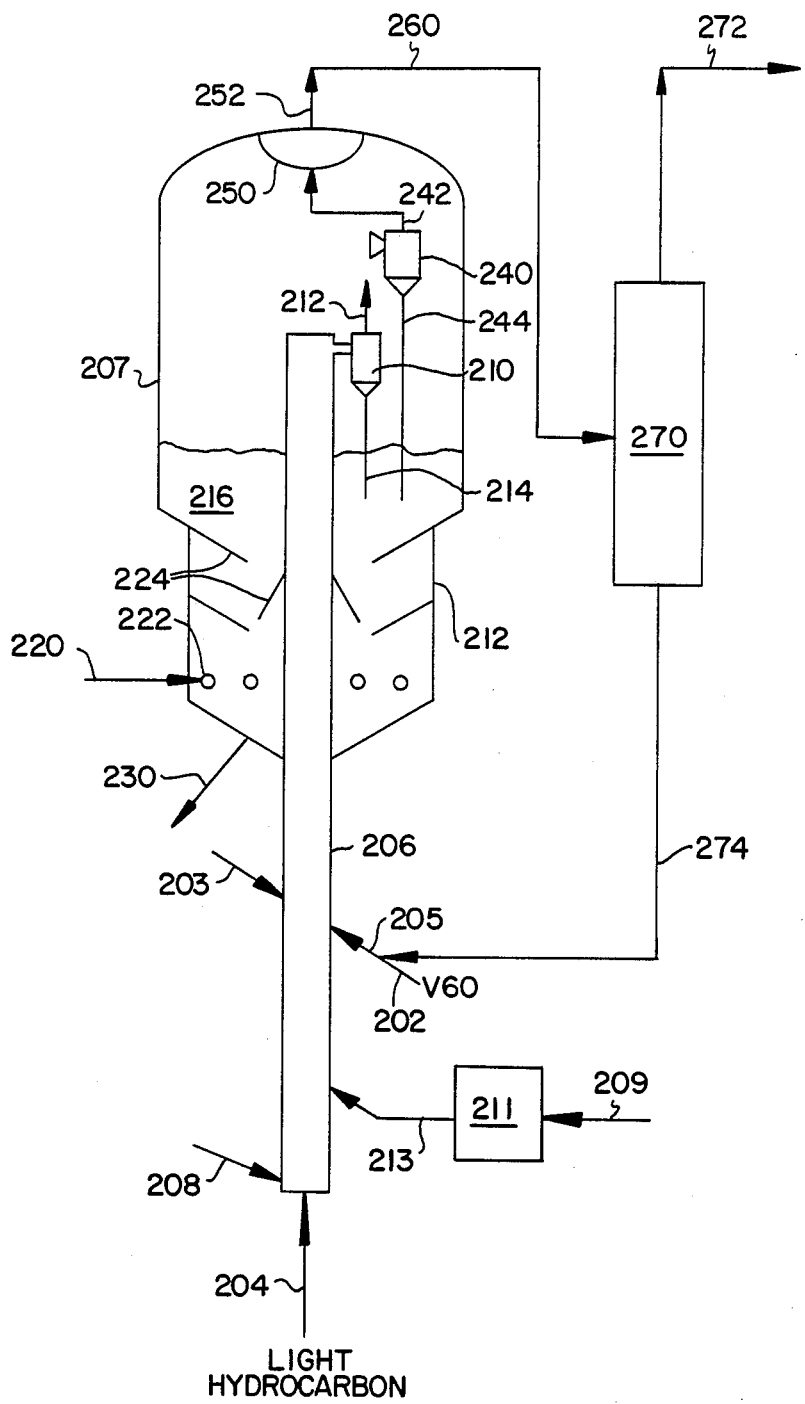
FIG. 2 illustrates a schematic diagram of a single riser fluid catalytic cracking system as a second embodiment of the present invention.

As shown in FIG. 2, a light hydrocarbon stream passes through a conduit 204 into a riser 206 where it combines with a first regenerated catalyst stream which passes through conduit 208. The catalyst in conduit 208 is typically at a temperature between 1200° and 1600° F. (649°–871° C.). The light hydrocarbons and catalyst pass upwardly through the riser 206, thereby cracking a portion of the light hydrocarbons to form reactive compounds.

A residuum stream passes through a conduit 209 into a microwave heater 211. The microwave heater 211 heats the residuum at least 25° F. (14° C.), preferably at least 200° F. Typically, the microwave energy heats the residuum to between 600° and 820° F. (316°–438° C.) and the residuum is exposed to the microwave energy for, at most, 5 minutes. Optionally, the residuum may be preheated by means other than microwave energy. Preferably, the microwave energy heats the residuum to between 820° and 1100° F. (438°–593° C.) and the residuum is exposed to the microwave energy for, at most, 1 minute, more preferably, at most, 30 seconds. Most preferably, the microwave energy heats the residuum to a temperature between 900° and 1100° F. (482°–593° C.) and the residuum is exposed to the microwave energy for, at most, 15 seconds. The lower residence times are employed with the higher temperatures to minimize overcracking and coking. Heating the residuum by exposure to microwave energy also cracks a portion of the residuum into reactive compounds, such as free radicals and olefins, thereby making the residuum more reactive. The microwave heater 211 minimizes coke formation while heating the residuum by uniformly heating the residuum as it passes through a coil (not shown) within heater 211. This distinguishes over conventional heating, wherein the residuum contacts hot coil walls so temperature of residuum at the wall is hotter than in the center of the flowing stream. Coking is both time- and temperature-dependent. Thus, the present invention also reduces coke formation by quickly heating the residuum to desired temperature.

The microwave-activated residuum passes through a conduit 213 into the riser 206 to combine with the first catalyst stream and light hydrocarbons. The residuum is injected into the riser 206 at a point sufficiently downstream of where the first catalyst stream and light hydrocarbons combine so a portion of the light hydrocarbons are converted to reactive compounds prior to combination with the residuum. The catalyst, light hydrocarbons and residuum form a first mixture which passes upwardly through the riser for a residuum residence time of preferably less than 1 second, most preferably between 0.5 and 1 second, and then contacts a second catalyst stream and a hydrocarbon steam provided by conduits 203, 205 respectively. The catalyst in conduit 203 is typically at a temperature between 1200° and 1600° F. (649°–871° C.). The hydrocarbons in conduit 205 preferably comprise vacuum gas oil from conduit 202 and recycled heavy cycle oil and/or main column bottoms from conduit 274. The second catalyst stream, hydrocarbon stream and first mixture combine in riser 206 to form a second mixture, which continues upwardly through the riser 206 and into a riser cyclone 210 located within a reactor vessel 207.

Cyclone 210 separates the second mixture into a catalyst stream which passes through a dipleg 214 to a catalyst bed 216 located therebelow, and a gaseous stream which passes through cyclone overhead conduit 212 into the atmosphere of the vessel 207. The gaseous stream passes from the atmosphere into a cyclone 240 which separates the gaseous stream into a catalyst stream which passes through a dipleg 244 to the bed 216. The remaining gaseous stream passes through a cyclone overhead withdrawal conduit 242 to a plenum chamber 250. The gaseous stream then passes from the plenum chamber 250 into a reactor vessel overhead conduit 252, and then into a conduit 260 attached to a distillation unit 270. If desired, the cyclones 210, 240 can be arranged in a closed cyclone arrangement (not shown), as disclosed in U.S. Pat. No. 4,502,947 to Haddad et al, which is incorporated herein by reference.

The distillation unit 270 separates the hydrocarbon overhead from conduit 260 into a product stream 272, preferably comprising approximately 650° F.−(343° C.−) hydrocarbons, and a heavy cycle oil stream comprising approximately 650° F.+ (343° C.+) hydrocarbons. The heavy cycle oil passes through the conduit 274 and combines with the vacuum gas oil from conduit 202, prior to recycling through conduit 205 into the riser 206.

The catalyst in bed 216 passes downwardly through a stripping vessel 218 located in a lower portion of the reactor vessel 207. In vessel 218, the catalyst in bed 216 countercurrently contacts stripping gas provided by a conduit 220 attached to a stripping gas header 222. Perforated trays (baffles) 224 may be provided to enhance the countercurrent contact. Stripped catalyst then exits from vessel 218 through a catalyst withdrawal conduit 230 and passes to a regenerator vessel (not shown). The embodiment of the present invention shown in FIG. 2 has the advantages that it employs a single riser and yet achieves a preliminary cracking reaction of microwave-activated residuum, activated light hydrocarbons and catalyst during a short residence time before contacting a second stream of catalyst and a stream of vacuum gas oil and recycle heavy cycle oil and/or main column bottoms. Because both the light hydrocarbons high temperature catalyst mixture and the residuum contain reactive compounds, substantial cracking and reaction occur in less than 1 second, thereby minimizing coking associated with longer residence times. The vacuum gas oil and recycled heavy cycle oil dilute the residuum in the riser to minimize further coking. The vacuum gas oil and cycle oil may also quench the mixture of light hydrocarbons, residuum and catalyst in the riser as much as 300° F. (167° C.), preferably between 50° and 300° F. (28°–167° C.) to further minimize coking. Employing microwave energy to preheat the residuum also reduces coking by quickly heating the residuum to desired high temperatures between 900° and 1100° F. (482°–593° C.), thereby minimizing the time the residuum is exposed to these high temperatures.

Figure 3:
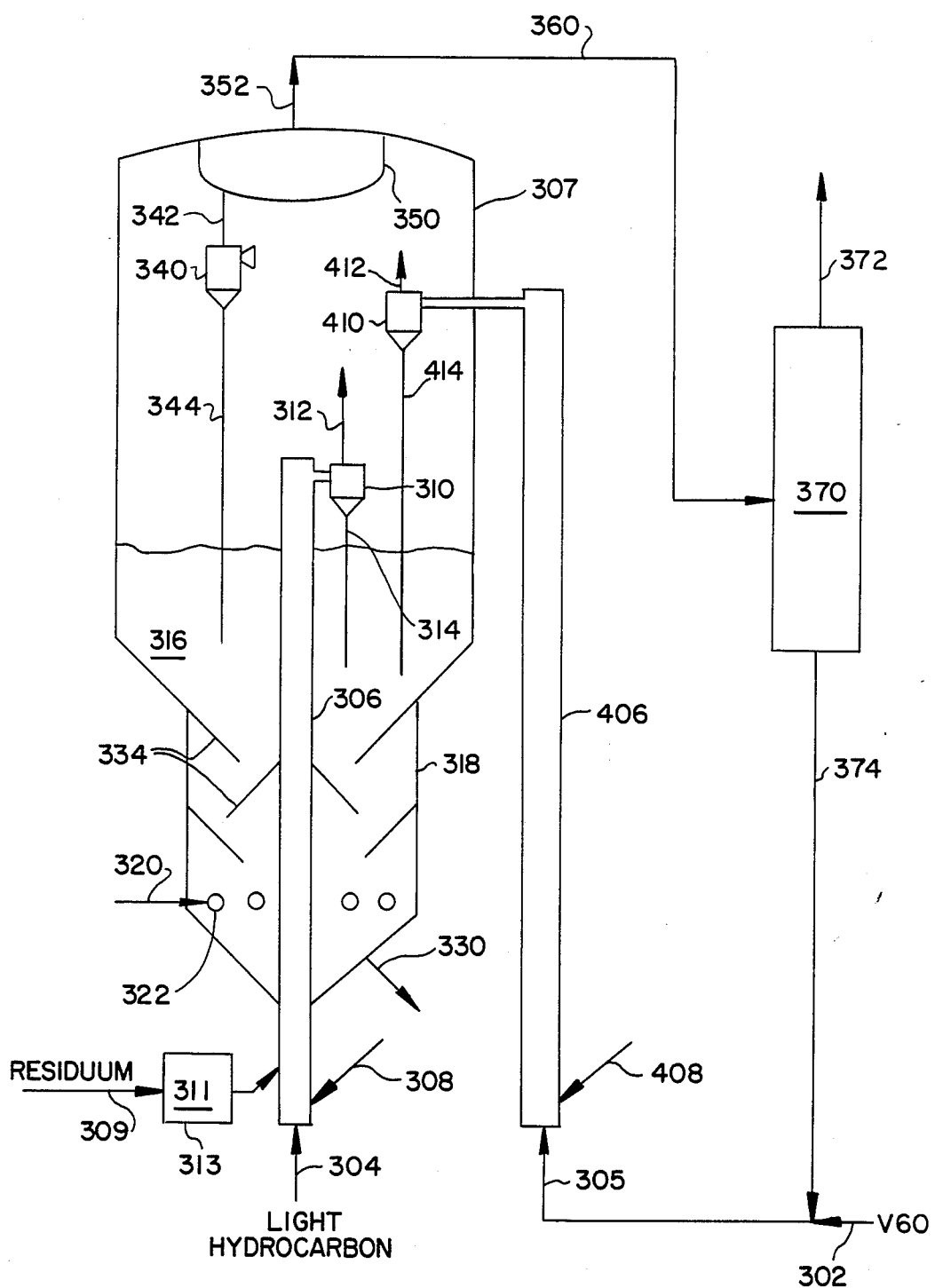
FIG. 3 illustrates a schematic diagram of a dual riser fluid catalytic cracking system as a third embodiment of the present invention.

As shown in FIG. 3, light hydrocarbon passes through a conduit 304 into a first fluid catalytic cracking riser reactor 306 to combine with a first regenerated catalyst stream, from a regenerator (not shown), which passes through conduit 308 which is attached to a fluid catalytic cracking regenerator (not shown). The light hydrocarbons comprise $C_1$-$C_4$ hydrocarbons, preferably a portion of which are olefins. The first regenerated catalyst stream in conduit 308 is typically at a temperature between 1200° and 1600° F. (649°–871° C.). Residuum passes through a conduit 309 into a microwave heater 311. Typically, the residuum comprises hydrocarbons having an initial boiling point of at least 400° F. (204° C.) and a final boiling point of at least 1000° F. (538° C.). The heater 311 heats the residuum by at least 25° F. (14° C.), preferably by at least 200° F. Typically, the microwave energy heats the residuum to beween 600° and 820° F. (316°–438° C.) and the residuum is exposed to the microwave energy for, at most, 5 minutes. Optionally, the residuum is preheated by means other than microwave energy. Preferably, the microwave energy heats the residuum to between 820° and 1100° F. (438°–593° C.) and the residuum is exposed to the microwave energy for, at most, 1 minute, more preferably, at most, 30 seconds. Most preferably, the microwave energy heats the residuum to a temperature between 900° and 1100° F. (482°–593° C.) and the residuum is exposed to the microwave energy for, at most, 15 seconds. The lower residence times are employed with the higher temperatures to minimize overcracking and coking. The heated residuum then passes from microwave heater 311, through a conduit 313, into the first riser 306 to combine with the first catalyst stream and light hydrocarbons to form a first mixture which passes upwardly through the riser 306, at fluid catalytic cracking conditions, to crack the hydrocarbons from the residuum and light hydrocarbon streams.

Prior to contacting the first catalyst stream and light hydrocarbons with the residuum, a portion of the light hydrocarbons will crack by contact with the hot first catalyst stream from conduit 308 to form reactive compounds, such as olefins and free radicals. In the microwave heater 311, the residuum from conduit 309 is exposed to microwave energy from 1 to 1000 gigacycles per second ($1 \times 10^9$ to $10^{12}$ cycles per second). In addition to heating the residuum, the microwave energy causes a portion of the residuum to crack to a second set of reactive compounds comprising olefins and free radicals. Injecting olefins into a riser is discussed in U.S. Pat. No. 3,894,931 to Nace et al. Because both the light hydrocarbons and the heated residuum contain reactive compounds, combining the light hydrocarbons, catalyst and residuum at fluid catalytic cracking conditions in the riser achieves fast fluid catalytic cracking of the residuum. Accordingly, the residuum residence time within riser 306 is preferably less than 1 second, most preferably between 0.5 and 1 second. The reactive compounds, produced by microwaving, in the residuum may react with the reactive compounds in the light hydrocarbons. This promotes production of adducts, such as gasoline and distillate boiling range hydrocarbons, while upgrading catalytically cracked residuum.

The first riser 306 terminates within a reactor vessel 307, so the mixture of catalyst and hydrocarbons passes upwardly through riser 306 and discharges from the riser into a riser cyclone 310 located within reactor vessel 307. Riser cyclone 310 separates the mixture into a catalyst stream which passes through a dipleg 314 into a catalyst bed 316 located therebelow, and a gaseous stream which exits through cyclone overhead conduit 312 and passes into an atmosphere of the vessel 307. The gaseous material passes from the atmosphere into a cyclone 340, which further separates catalyst from the gaseous material and passes the catalyst through dipleg 344 and the remaining gaseous material through overhead conduit 342 to a plenum chamber 350. The gaseous material passes from the plenum chamber 350 to a vessel overhead conduit 352 to a conduit 360.

Vacuum gas oil passes through a conduit 302 and combines with a heavy cycle oil stream and/or main column bottoms from a conduit 374. The combined stream passes through conduit 305 into a second fluid catalytic cracking riser reactor 406, where it combines with a second regenerated catalyst stream from conduit 408 from a regenerator (not shown) to form a second mixture. The catalyst in conduit 408 typically has a temperature between 1200° and 1600° F. (649°–871° C.). The second mixture passes upwardly through riser 406 and discharges into a riser cyclone 410 located within a reactor vessel 307. Riser cyclone 410 separates the second mixture into a catalyst stream, which passes through a dipleg 414 to the catalyst bed 316 located therebelow, and a gaseous stream which passes through a cyclone overhead conduit 412 into an atmosphere of the vessel 307. The gaseous material then passes from the atmosphere of the vessel 307 into the cyclone 340, which separates catalyst from the gaseous material and passes the separated catalyst through a dipleg 344 to the bed 316. The remaining gaseous material passes through cyclone overhead conduit 342 to the plenum chamber 350. The remaining gaseous material then passes from chamber 350 to the reactor vessel overhead conduit 352, and then into conduit 360.

If desired, the cyclones in vessel 307 may be arranged in a closed cyclone arrangement (not shown), as disclosed in U.S. Pat. No 4,502,947 to Haddad et al. The catalyst in bed 316 passes downwardly through a stripping vessel 318 located in a lower portion of reactor vessel 307. In vessel 318, the catalyst countercurrently contacts stripping gas provided by a stripping gas conduit 320 attached to a stripping gas header 322. Trays 334 may be provided to enhance stripping. The stripped catalyst then passes from the stripping vessel 318 through a catalyst withdrawal conduit 330 to a fluid catalytic cracking regenerator (not shown). The gaseous overhead from conduit 352 passes into the conduit 360 which is attached to a distillation unit 370. Distillation unit 370 comprises one or more distillation towers or flash drums (not shown) to separate the hydrocarbons from conduit 360 into product stream 372, and a heavy cycle oil stream which passes through conduit 374. The product stream comprises approximately 650° F.−(343° C.−) hydrocarbons. The heavy cycle oil comprises approximately 650° F.+ (343° C.+) boiling point hydrocarbons. The heavy cycle oil then passes through conduit 374, combines with vacuum gas oil from conduit 302, and then passes through conduit 305 into the second riser 406.

The advantages of the third embodiment of the present invention include providing a quick initial cracking of residuum. The quick cracking occurs because the residuum is activated by microwave energy and then combined, at fluid catalytic cracking conditions, with fluid catalytic cracking catalyst and light hydrocarbons which comprise reactive compounds. The present invention minimizes coke by employing quick heating with microwave energy plus a short residence time of residuum in the riser. The process further enhances yields by separating the heaviest portion of the cracked residuum and recycling it to a second fluid catalytic cracking riser in combination with vacuum gas oil. The process also enhances yields by promoting reaction of activated residuum and reactive light hydrocarbon compounds.

The above description, and the accompanying drawings, are merely illustrative of the application of the principles of the present invention and are not limiting. Numerous other arrangements which employ the principles of the invention and fall within its spirit and scope may be readily devised by those skilled in the art. Accordingly, the invention is not limited by the foregoing description, but is only limited by the scope of the appended claims.

We claim:

1. A process for fluid catalytic cracking, comprising the steps of:
    (a) passing a lift gas comprising $C_1$–$C_4$ hydrocarbons into a fluid catalytic cracking riser;
    (b) passing a fluid catalytic cracking catalyst stream into said riser to combine with said lift gas;
    (c) exposing a residuum stream to sufficient microwave energy to increase the temperature of the residuum by at least 25° F. over its temperature prior to said exposure in the absence of fluid catalytic cracking catalyst; and
    (d) passing said microwave treated residuum into said riser wherein it is combined with said catalyst and lift gas to form a mixture under fluid catalytic cracking conditions and cracking said mixture to form a cracked product.

2. The process of claim 1, wherein said residuum is preheated prior to said exposing to microwave energy.

3. The process of claim 2, wherein said microwave energy heats said preheated residuum stream to between about 600° and 820° F., and said residuum is exposed to said microwave energy for, at most, 5 minutes.

4. The process of claim 3, wherein said residuum is exposed to said microwave energy for, at most, 1 minute.

5. The process of claim 2, wherein said microwave energy heats said preheated residuum to between about 820° and 1100° F.

6. The process of claim 5 wherein said residuum is exposed to said microwave energy for, at most, 30 seconds.

7. The process of claim 1, wherein said microwave energy heats said residuum stream to between about 900° and 1100° F.

8. The process of claim 7, wherein said residuum is exposed to said microwave energy for, at most, 15 seconds.

9. The process of claim 1, wherein said lift gas comprises $C_2$–$C_4$ olefins.

10. The process of claim 1, wherein said cracking conditions comprises a residuum residence time of less than 1 second in said riser.

11. The process of claim 1, wherein said residuum residence time in said riser is between 0.5 and 1 second.

* * * * *